United States Patent [19]

Baierweck et al.

[11] Patent Number: 5,405,890
[45] Date of Patent: Apr. 11, 1995

[54] FLAMEPROOFED BLACK POLYAMIDE MOLDING MATERIALS

[75] Inventors: Petra Baierweck, Boehl-Iggelheim; Doris Zeltner, Roemerberg; Brigitte Gareiss; Heiner Goerrissen, Ludwigshafen; Karlheinz Ulmerich, Lambsheim; Klaus Muehlbach, Gruenstadt; Michael Gall, Mannheim, all of Germany

[73] Assignee: BASF Aktiengesellschaft, Ludwigshafen, Germany

[21] Appl. No.: 182,708

[22] Filed: Jan. 13, 1994

[30] Foreign Application Priority Data

Jan. 21, 1993 [DE] Germany .................. 43 01 541.7

[51] Int. Cl.⁶ .................. C08K 5/3467; C08K 3/22; C08K 3/02
[52] U.S. Cl. .................. 524/88; 523/205; 524/80; 524/406; 524/407; 524/413; 524/449; 524/450; 524/606
[58] Field of Search .................. 524/88, 407, 406, 413, 524/450, 449, 80, 606; 523/205

[56] References Cited

U.S. PATENT DOCUMENTS

| | | | |
|---|---|---|---|
| 3,011,904 | 12/1961 | Ballentine et al. | 524/606 |
| 3,156,665 | 11/1964 | Brossman et al. | 524/606 |
| 3,215,663 | 11/1965 | Weisberg | 524/606 |
| 3,352,821 | 11/1967 | Costain et al. | 524/413 |
| 3,778,407 | 12/1973 | Hild . | |
| 3,883,475 | 5/1975 | Racky et al. | 524/406 |
| 4,314,927 | 2/1982 | Theysohn et al. | 260/37 |
| 4,314,929 | 2/1982 | Mahoney | 524/606 |
| 4,471,080 | 9/1984 | Rinaldi | 523/205 |
| 4,670,487 | 6/1987 | Nielinger et al. | 523/205 |
| 4,921,896 | 5/1990 | Bonin et al. | 524/403 |

FOREIGN PATENT DOCUMENTS

| | | |
|---|---|---|
| 255901 | 2/1988 | European Pat. Off. . |
| 157756 | 11/1988 | European Pat. Off. . |
| 332965 | 9/1989 | European Pat. Off. . |
| 1931387 | 10/1974 | Germany . |

OTHER PUBLICATIONS

*Pat. Abst. of Japan*, vol. 3, No. 3 (C-033), Jan. 16, 1979 (English abstract of JP-A 53124564).
*Pat. Abst. of Japan*, vol. 11, No. 13 (C—397), Jan. 14, 1987 (English abstract of JP-A 61190557).
*Database WPI*, Derwent Publications, Section Ch, Week 8330, AN 83-720839 (English abstract of JP-A 58 104218).
Technisches Informationsblatt, Uber Heliogen-Pigmente der BASF AG, 1980.

Primary Examiner—Veronica P. Hoke
Attorney, Agent, or Firm—Keil & Weinkauf

[57] ABSTRACT

A flameproofed black thermoplastic molding material containing
A) from 5 to 98.9% by weight of a thermoplastic polyamide,
B) from 1 to 20% by weight of red phosphorus
C) from 0.1 to 5% by weight of a colorant complementary with red phosphorus to produce blackened polyamide,
D) from 0 to 30% by weight of an elastomeric polymer,
E) from 0 to 50% by weight of a fibrous or particulate filler or of a mixture thereof,
F) from 0 to 70% by weight of a polyphenylene ether and
G) from 0 to 30% by weight of conventional additives and processing assistants, the percentages by weight of components A to G being 100% in each case.

12 Claims, No Drawings

FLAMEPROOFED BLACK POLYAMIDE MOLDING MATERIALS

DESCRIPTION

The present invention relates to flameproofed black thermoplastic molding materials containing A) from 5 to 98.9% by weight of a thermoplastic polyamide,
B) from 1 to 20% by weight of red phosphorus
C) from 0.1 to 5% by weight of a colorant
D) from 0 to 30% by weight of an elastomeric polymer,
E) from 0 to 50% by weight of a fibrous or particulate filler or of a mixture thereof,
F) from 0 to 70% by weight of a polyphenylene ether and
G) from 0 to 30% by weight of conventional additives and processing assistants, the percentages by weight of components A to G being 100% in each case.

The present invention furthermore relates to the use of such molding materials for the production of fibers, films and moldings, and to the moldings obtainable from these molding materials.

The coloring of thermoplastics, in particular of polyamides, has long been known (cf. for example Technisches Informationsblatt über Heliogen ®-Pigmente der BASF AG, 1980).

The use of red phosphorus as a flameproofing agent for polyamides is disclosed in, inter alia, DE-A 19 31 387 or DE-A-19 67 354.

Carbon black or nigrosines are usually used for coloring polyamides black, and gray to black hues of any gradation can be obtained depending on the amount of these additives or of their mixture with other colorants, as disclosed in EP-A-157 756.

Polyamides flameproofed with phosphorus and colored black with the organic pigment nigrosine have insufficient phosphorus stability and lightfastness and are unsafe to handle and in terms of environmental aspects. Phosphorus-containing polyamide moldings colored with carbon black are suitable only to a limited extent for applications in the electronics and electrical industry since the creep resistance (CTI) and other electrical properties are inadequate.

It is an object of the present invention to provide black flameproofed polyamide molding materials which have good lightfastness and good electrical properties, in particular good creep resistance and at the same time good phosphorus stability.

We have found that this object is achieved by the thermoplastic molding materials defined at the outset. Preferred embodiments are described in the subclaims.

The novel molding materials contain, as component A), from 5 to 98.9, preferably from 20 to 98, in particular from 30 to 95, % by weight of a thermoplastic polyamide.

The polyamides of the novel molding materials generally have a relative viscosity $\eta_{rel}$ of from 1.7 to 5.0, determined in a 1% strength by weight solution in 96% strength by weight sulfuric acid at 25° C., which corresponds to a K value (according to Fikentscher) of from 50 to 96. Polyamides having a relative viscosity of from 2.3 to 4.5, in particular from 2.5 to 4.0, are preferably used.

Semicrystalline or amorphous resins having a weight average molecular weight of at least 5,000, as described, for example, in U.S. Pat. Nos. 2,071,250, 2,071,251, 2,130,523, 2,130,948, 2,241,322, 2,312,966, 2,512,606 and 3,393,210, are preferred.

Examples of these are polyamides which are derived from lactams having 7 to 13 ring members, such as polycaprolactam, polycapryllactam and polylaurolactam, and polyamides which are obtained by reacting dicarboxylic acids with diamines.

The dicarboxylic acids which may be used are alkanedicarboxylic acids of 6 to 12, in particular 6 to 10, carbon atoms and aromatic dicarboxylic acids. Only adipic acid, azelaic acid, sebacic acid, dodecanedioic acid and terephthalic or isophthalic acid are mentioned here.

Particualrly suitable diamines are alkanediamines of 6 to 12, in particular 6 to 8, carbon atoms and m-xylylenediamine, di-(4-aminophenyl)-methane, di-(4-aminocyclohexyl)-methane, 2,2-di-(4-aminophenyl)-propane or 2,2-di-(4-aminocyclohexyl)-propane.

Preferred polyamides are polyhexamethyleneadipamide, polyhexamethylenesebacamide and polycaprolactam.

Other polyamides which may be mentioned are those which are obtainable, for example, by condensation of 1,4-diaminobutane with adipic acid at elevated temperatures (polyamide 4,6). Preparation processes for polyamides having this structure are described in, for example, EP-A 38 094, EP-A 38 582 and EP-A 39 524.

Polyamides which are obtainable by copolymerization of two or more of the abovementioned monomers, or mixtures of a plurality of polyamides, are also suitable, any ratio of components in the mixture being possible.

Such partly aromatic, partly crystalline copolyamides are composed of:

$A_1$) 20–90% by weight of units which are derived from terephthalic acid and hexamethylenediamine, $A_2$) 0–50% by weight of units which are derived from ε-caprolactam, $A_3$) 0–80% by weight of units which are derived from adipic acid and hexamethylenediamine, and $A_4$) 0–40% by weight of further polyamide-forming monomers, the amount of component ($A_2$) or ($A_3$) or ($A_4$) or of the mixture thereof being at least 10% by weight.

The component A1) contains 20–90% by weight of units which are derived from terephthalic acid and hexamethylenediamine.

In addition to the units which are derived from terephthalic acid and hexamethylenediamine, the copolyamides contain units which are derived from ε-caprolactam and/or units which are derived from adipic acid and hexamethylenediamine and/or units which are derived from further polyamide-forming monomers.

The amount of units which are derived from ε-caprolactam is not more than 50, preferably from 20 to 50, in particular from 25 to 40, % by weight, or the amount of units which are derived from adipic acid and hexamethylenediamine is up to 80, preferably from 30 to 75, in particular from 35 to 60, % by weight.

The copolyamides may also contain both units of ε-caprolactam and units of adipic acid and hexamethylenediamine; in this case, it is advantageous if the amount of units which are free of aromatic groups is at least 10, preferably at least 20, % by weight. The ratio of the units which are derived from ε-caprolactam to those which are derived from adipic acid and hexamethylenediamine is not subject to any particular restriction.

Polyamides having from 50 to 80, in particular from 60 to 75, % by weight of units which are derived from terephthalic acid and hexamethylenediamine (units $A_1$)) and from 20 to 50, preferably from 25 to 40, % by weight of units which are derived from ε-caprolactam (units $A_2$)) have proven particularly advantageous for many intended uses.

In addition to the units $A_1$) to $A_3$) described above, the partly aromatic copolyamides may contain up to 40, preferably 10–30, in particular 20–30, % by weight of further polyamide-forming monomers $A_4$), as are known from other polyamides.

Aromatic dicarboxylic acids $A_4$) are of 8 to 16 carbon atoms. Suitable aromatic dicarboxylic acids are, for example, isophthalic acid, substituted terephthalic and isophthalic acids, such as 3-tert-butylisophthalic acid, polynuclear dicarboxylic acids, e.g. 4,4'- and 3,3'-biphenyldicarboxylic acid, 4,4'- and 3,3'-diphenylmethanedicarboxylic acid, 4,4'- and 3,3'-dicarboxydiphenyl sulfone, 1,4- and 2,6-naphthalinedicarboxylic acid and phenoxyterephthalic acid, isophthalic acid being particularly preferred.

Further polyamide-forming monomers $A_4$) may be derived from dicarboxylic acids of 4 to 16 carbon atoms and aliphatic or cycloaliphatic diamines of 4 to 16 carbon atoms, as well as from aminocarboxylic acids or corresponding lactams of 7 to 12 carbon atoms. Some suitable monomers of these types which may be mentioned here are suberic acid, azelaic acid and sebacic acid as typical aliphatic dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane as typical diamines and capryllactam, enantholactam, ω-aminoundecanoic acid and laurolactam as typical lactams or aminocarboxylic acids.

The following compositions of the component (A) are particularly preferred:

$A_1$) from 65 to 85% by weight of units which are derived from terephthalic acids and hexamethylenediamine and $A_4$) from 15 to 35% by weight of units which are derived from isophthalic acid and hexamethylenediamine or $A_1$) from 50 to 70% by weight of units which are derived from terephthalic acid and hexamethylenediamine and $A_3$) from 10 to 20% by weight of units which are derived from adipic acid and hexamethylenediamine and $A_4$) from 20 to 30% by weight of units which are derived from isophthalic acid and hexamethylenediamine.

If the component ($A_4$) contains symmetrical dicarboxylic acids in which the carboxyl groups are in the para position, it is advisable to combine these with ($A_1$) and ($A_2$) or ($A_1$) and ($A_3$) to give ternary copolyamides, since otherwise the copolyamide has too high a melting point and melts only with decomposition, which is undesirable.

Furthermore, such partly aromatic copolyamides whose triamine content is less than 0.5, preferably less than 0.3, % by weight has proven particularly advantageous.

Partly aromatic copolyamides prepared by most known processes (cf. US-A 4 603 166) have triamine contents which are more than 0.5% by weight, which leads to a deterioration in the product quality and to problems during the continuous preparation. Dihexamethylenetriamine, which forms from the hexamethylenediamine used in the preparation, may be mentioned in particular as a triamine which causes these problems.

With the same solution viscosity, copolyamides having a low triamine content have lower melt viscosities compared with products which have the same composition and a higher triamine content.

This considerably improves both the processability and the product properties.

The melting points of the partly aromatic copolyamides are from 270° to 325° C., preferably from 280° to 310° C., this high melting point also being associated with a high glass transition temperature of, as a rule, more than 75° C., in particular more than 85° C. (in the dry state).

Binary copolyamides based on terephthalic acid, hexamethylenediamine and ε-caprolactam and containing about 70% by weight of units which are derived from terephthalic acid and hexamethylenediamine have melting points of about 300° C. and (in the dry state) a glass transition temperature of more than 110° C.

Binary copolyamides based on terephthalic acid, adipic acid and hexamethylenediamine reach melting points of 300° C. or more even with lower contents of about 55% by weight of units of terephthalic acid and hexamethylenediamine (HMD), the glass transition temperature being not quite as high as in the case of binary copolyamides which contain ε-caprolactam instead of adipic acid or adipic acid/HMD.

The preparation of the preferred partly aromatic copolyamides having a low triamine content can be carried out by the processes described in EP-A 129 195 and 129 196.

The novel molding materials contain, as component (B), from 1 to 30, preferably from 1 to 15, in particular from 3 to 10, % by weight of red phosphorus, in particular in combination with glass fiber-reinforced molding materials, and said phosphorus can be used in untreated form.

However, particularly suitable formulations are those in which the phosphorus is coated on the surface with low molecular weight liquid substances, such as silicone oil, liquid paraffin or esters of phthalic acid or adipic acid or with polymeric or oligomeric compounds, for example with phenol resins or aminoplasts and polyurethanes.

Masterbatches of red phosphorus, for example in a polyamide or elastomer are also suitable as flameproofing agents. Polyolefin homo- and copolymers are particularly suitable as masterbatch polymers. However, the amount of the masterbatch polymer should not be more than 35% by weight, based on the weight of the components (A) and (B) in the novel molding material.

The median particle size ($d_{50}$) of the phosphorus particles distributed in the molding materials is preferably from 0.0001 to 0.5 mm, in particular from 0.001 to 0.2 min.

The content of the component B) in the novel molding materials is based on the sum of the components A) to G).

The novel molding materials can contain, as component C), from 0.1 to 5, preferably from 0.4 to 3, in particular from 0.5 to 1.5, % by weight of a colorant.

Colorants are understood in general as being all color-imparting substances according to DIN 55 944, which may be divided into inorganic and organic colorants and natural and synthetic ones (cf. Römpps Chemie Lexikon, 1981, 8th Edition, page 1237).

Since the red phosphorus gives a yellow to deep red coloration in the thermoplastic molding materials, green, blue or violet pigments or mixtures thereof are accordingly used as pigments C) having a complementary color, in order to achieve, as desired, a black color of the molding materials.

Pigments belong both to the organic and to the inorganic colorants and differ from dyes in that pigments are colorants which are insoluble in solvents and/or binders. These are generally classified according to the Color Index (C.I.), a C.I. designation permitting unambiguous assignment being given in addition to systematic or trivial names.

Examples of preferred pigments are copper phthalocyanine pigments, which have a green or blue color. The green color is generally achieved by substitution of hydrogen by chlorine atoms in the macrocyclic tetramine.

Further suitable pigments are manganese violet pigments (pyrophosphates of ammonium and manganese(III) of the formula $MnNH_4P_2O_7$, which, by variation of the stoichiometric composition, give bluer or redder hues), and ultramarine pigments (sodium or aluminum silicates) and blue and green pigments based on, for example, chromium oxides or cobalt oxides having the spinel structure. Such pigments are commercially available under the trade names Heliogen® blue, Heliogen® green, Sicopal® green and Sicopal® blue (registered trademark of BASF AG) and as ultramarine, chromium oxide or manganese violet pigments.

Preferred pigments according to C.I. Part 1 are Pigment Blue 15, Pigment Blue 15:2, Pigment Blue 15:4, Pigment Blue 16, Pigment Blue 28, Pigment Blue 29, Pigment Blue 36, Pigment Green 17, Pigment green 24, Pigment green 50, Pigment violet 15 and Pigment Violet 16, Pigment Blue 15:1 and 15:3 and Pigment Green 7 and 36 being particularly preferred.

The pigments generally have a mean particle diameter of from 0.3 to 8 μm, preferably from 0.7 to 7 μm.

The novel copolyamides may contain, as further components, from 0 to 40, preferably from 10 to 35, in particular from 15 to 35, % by weight of a fibrous or particulate filler (component (B)) or of a mixture thereof.

Preferred fibrous reinforcing agents are carbon fibers, potassium titanate whiskers, Aramid fibers and particularly preferably glass fibers. When glass fibers are used, they may be treated with a size and an adhesion promoter in order to improve the compatibility with the thermoplastic polyamide (A). In general the glass fibers used have a diameter of from 6 to 20 μm.

These glass fibers can be incorporated both in the form of short glass fibers and in the form of rovings. In the finished injection molded part, the mean length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with 15% by weight of wollastonite.

The novel thermoplastic molding materials may contain, as component (D), from 0 to 30, preferably from 5 to 20, in particular from 5 to 15, % by weight of an elastomeric polymer. Preferred elastomeric polymers are polymers based on olefins, which are composed of the following components:

$d_1$) 40–100% by weight of at least one α-olefin of 2 to 8 carbon atoms, $d_2$) 0–50% by weight of a diene, $d_3$) 0–45% by weight of a $C_1$–$C_{12}$-alkyl ester of acrylic acid or methacrylic acid or a mixture of such esters, $d_4$) 0–40% by weight of an ethylenically unsaturated mono- or dicarboxylic acid or a functional derivative of such an acid, $d_5$) 0–40% by weight of an epoxy-containing monomer and $d_6$) 0–5% by weight of other monomers capable of undergoing free radical polymerization, with the proviso that the component (D) is not an olefin homopolymer.

A first preferred group comprises the ethylene/propylene (EPM) and ethylene/propylene/diene (EPDM) rubbers, which preferably have a ratio of ethylene to propylene units of from 40:60 to 90:10.

The Mooney viscosities (MLI+4/100° C.) of such, preferably uncrosslinked, EPM and EPDM rubbers (gel contents generally less than 1% by weight) are preferably from 25 to 100, in particular from 35 to 90 (measured using the large rotor after a running time of 4 minutes at 100° C. according to DIN 53 523).

EPM rubbers generally have virtually no more double bonds, whereas EPDM rubbers may have from 1 to 20 double bonds per 100 carbon atoms.

Examples of diene monomers $d_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene or 2-isopropenyl-5-norbornene, and tricyclodienes, such as 3-methyl-tricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15, % by weight, based on the total weight of the olefin polymer.

EPM or EPDM rubbers may preferably also be grafted with reactive carboxylic acids or derivatives thereof. Particular examples of these are acrylic acid, methacrylic acid and derivatives thereof, as well as maleic anhydride.

A further group of preferred olefin polymers comprises copolymers of α-olefins of 2 to 8 carbon atoms, in particular of ethylene, with $C_1$–$C_{18}$-alkyl esters of acrylic acid and/or methacrylic acid.

All primary and secondary $C_1$–$C_{18}$-alkyl esters of acrylic acid or methacrylic acid are in principle suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of the methacrylates and acrylates $d_5$) in the olefin polymers is 0–60, preferably 10–50, in particular 30–45, % by weight.

Instead of the esters d3), or in addition to these, the olefin polymers may also contain, as monomers, ethylenically unsaturated mono- or dicarboxylic acids d4) having acid functional groups and/ or latent acid functional groups or epoxy-containing monomers d5).

Examples of monomers d4) are acrylic acid, methacrylic acid, tertiary alkyl esters of these acids, in particular tert-butyl acrylate, and dicarboxylic acids, such as maleic acid and fumaric acid or derivatives of these acids, as well as monoesters thereof.

Monomers having latent acid functional groups are to be understood as meaning compounds which form free acid groups under the polymerization conditions or during incorporation of the olefin polymers into the molding materials. Examples of these are anhydrides of dicarboxylic acids of up to 20 carbon atoms, in particular maleic anhydride, and tertiary $C_1$–$C_{12}$-alkyl esters of the abovementioned acids, in particular tert-butyl acrylate and tertbutyl methacrylate.

The monomers having acid functional groups or latent acid functional groups and the epoxy-containing monomers are preferably incorporated in the olefin polymers by adding to the monomer mixture compounds of the general formulae I–IV

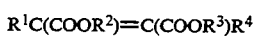  (I)

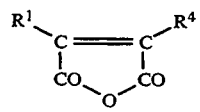  (II)

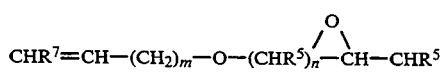  (III)

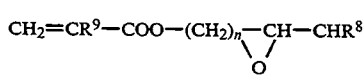  (IV)

where $R^1$–$R^9$ are each hydrogen or alkyl of 1 to 6 carbon atoms, m is an integer of from 0 to 20 and n is an integer of from 0 to 10.

$R^1$–$R^7$ are each preferably hydrogen, m is preferably 0 or 1 and n is preferably 1. The corresponding compounds are maleic acid, fumaric acid and maleic anhydride d4) and alkenyl glycidyl ether or vinyl glycidyl ether d5).

Preferred compounds of the formulae I, II, III and IV are maleic acid and maleic anhydride as component d4) and epoxy-containing esters of acrylic acid and/or methacrylic acid as component d5), glycidyl acrylate and glycidyl methacrylate being particularly preferred.

The amount of components d4) and d5) is, in each case, from 0.07 to 40, in particular from 0.1 to 20, particularly preferably from 0.15 to 15, % by weight, based on the total weight of the olefin polymers.

Olefin polymers comprising
from 50 to 98.9, in particular from 60 to 95, % by weight of ethylene,
from 0.1 to 20, in particular from 0.15 to 15, % by weight of glycidyl acrylate and/or glycidyl methacrylate, acrylic acid and/or maleic anhydride and
from 1 to 45, in particular from 10 to 35, % by weight of n-butyl acrylate and/or 2-ethylhexyl acrylate.
are particularly preferred.

Further preferred esters of acrylic and/or methacrylic acid are the methyl, ethyl, propyl and isobutyl esters.

Examples of suitable other monomers d6) are vinyl esters and vinyl ethers.

The preparation of the ethylene copolymers described above can be carried out by conventional methods, preferably by random copolymerization under high pressure and at elevated temperatures.

The melt flow index of the ethylene copolymers is in general from 1 to 80 g/10 min (meausred at 190° C. and a load of 2.16 kg).

In addition to the above preferred elastomeric polymers based on olefins, suitable elastomers (D) are, for example, emulsion polymers whose preparation is described in, for example, Houben-Weyl, Methoden der organischen Chemie, Volume XII. I (1961), and by Blackley in the monograph Emulsion Polymerization.

In principle, random elastomers or elastomers having a shell structure may be used. The shell-like structure is determined by the order of addition of the individual monomers.

Examples of monomers for the preparation of the elastomers are acrylates, such as n-butyl acrylate and 2-ethylhexyl acrylate, corresponding methacrylates and mixtures thereof. These monomers may be copolymerized with further monomers, such as styrene, acrylonitrile, vinyl ethers and further acrylates or methacrylates, such as methyl methacrylate, methyl acrylate, ethyl acrylate and propyl acrylate.

The use of emulsion polymers which have reactive groups at the surface is advantageous. Such groups are, for example, epoxy, carboxyl, latent carboxyl, amino or amido groups.

The graft monomers described in EP-A 208 187 are also suitable for introducing reactive groups at the surface.

The emulsion polymers may furthermore be completely or partially crosslinked. Examples of crosslinking monomers are buta-1,3-diene, divinylbenzene, diallyl phthalate and dihydrodicyclopentadienyl acrylate and the compounds described in EP-A 50 265.

It is also possible to use graft-linking monomers, i.e. monomers having two or more polymerizable double bonds which react at different rates during the polymerization.

Examples of such graft-linking monomers are allyl-containing monomers, in particular allyl esters of ethylenically unsaturated carboxylic acids, such as allyl acrylate, allyl methacrylate, diallyl maleate, diallyl fumarate and dialtyl itaconate, or the corresponding monoallyl compounds of these dicarboxylic acids. There is also a large number of further suitable graft-linking monomers; for further details, reference may be made here to, for example, U.S. Pat. No. 4,148,846.

In general, the amount of these crosslinking monomers in the component (D) is up to 5, preferably not more than 3, % by weight, based on (D).

Examples of preferred emulsion polymers are n-butyl acrylate/(meth)acrylic acid copolymers, n-butyl acrylate/glycidyl acrylate or n-butyl acrylate/glycidyl methacrylate copolymers and graft polymers having an inner core of n-butyl acrylate and an outer shell of the abovementioned copolymers.

The elastomers (D) described may also be prepared by other conventional methods, for example by suspension polymerization.

The novel thermoplastic molding materials may contain, as further component, from 0 to 50, preferably from 10 to 35, in particular from 15 to 35, % by weight of a fibrous or particulate filler (component (E)) or of a mixture thereof.

Preferred fibrous reinforcing agents are carbon fibers, potassium titanate whiskers, Aramid fibers and particularly preferably glass fibers. When glass fibers are used, they may be treated with a size and an adhesion promoter in order to improve the compatibility with the thermoplastic polyamide (A). In general, the glass fibers used have a diameter of from 6 to 20 μm.

These glass fibers can be incorporated both in the form of short glass fibers and in the form of rovings. In the finished injection molded part, the mean length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with 15% by weight of wollastonite.

The novel molding materials contain, as component F), up to 70, preferably up to 65, in particular up to 50, % by weight of a polyphenylene ether, up to 50, preferably up to 40, % by weight, based on F), of which polyphenylene ether may be replaced by a vinylaromatic polymer.

The polyphenylene ethers generally have a weight average molecular weight of from 10,000 to 80,000, preferably from 20,000 to 60,000.

This corresponds to a reduced specific viscosity ($\eta_{red}$) of from 0.2 to 0.9 dl/g, preferably from 0.35 to 0.8, in particular from 0.45 to 0.6, measured in a 0.5% strength by weight solution in chloroform at 25° C. according to DIN 53 726.

Suitable polyphenylene ethers $f_1$) are known per se and are preferably prepared by oxidative coupling of phenols disubstituted in the ortho position.

Examples of substituents are halogen, such as chlorine or bromine, and alkyl of 1 to 4 carbon atoms which preferably has no α tertiary hydrogen atom, for example methyl, ethyl, propyl or butyl. The alkyl radicals may in turn be substituted by halogen, such as chlorine or bromine, or by a hydroxyl group. Further examples of possible substituents are alkoxy, preferably of up to 4 carbon atoms, or phenyl which is unsubstituted or substituted by halogen and/or alkyl. Copolymers of different phenols, for example copolymers of 2,6-dimethylphenol and 2,3,6-trimethylphenol, are also suitable. Mixtures of different polyphenylene ethers can of course also be used.

Preferably used polyphenylene ethers are those which are compatible with vinylaromatic polymers, i.e. are completely or very substantially soluble in these polymers (cf. A. Noshay, Block Copolymers, pages 8 to 10, Academic Press, 1977, and O. Olabisi, Polymer-Polymer Miscibility, 1979, pages 117 to 189).

Examples of polyphenylene ethers are poly(2,6-dilauryl-1,4-phenylene ether), poly(2,6-diphenyl-1,4-phenylene ether), poly(2,6-di-methoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly- (2,6-dibenzyl-1,4-phenylene ether), poly(2-ethoxy-1,4-phenylene ether), poly- (2-chloro-1,4-phenylene ether) and poly(2,5-dibromo-1,4-phenylene ether). Preferably used polyphenylene ethers are those in which the substituents are alkyl radicals of 1 to 4 carbon atoms, such as poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2, 6-di-propyl-1,4-phenylene ether) and poly(2-ethyl-6-propyl-1,4-phenylene ether).

Graft copolymers of polyphenylene ethers and vinyl aromatic polymers, such as styrene, α-methylstyrene, vinyltoluene and chlorostyrene, are also suitable.

Functionalized or modified polyphenylene ethers, as disclosed in, for example, WO-A-86/02086, WO-A 87/00540, EP-A-222 246, EP-A-223 116 and EP-A-254 048, are preferably used.

In the preparation thereof, a polyphenylene ether $f_1$) is usually modified by incorporating at least one carbonyl, carboxyl, anhydride, amido, imido, ester, carboxylate, amino, hydroxyl, epoxy, oxazoline, urethane, urea, lactam or halobenzyl group, so that better compatibility with the polyamide is achieved.

The modification is generally effected by reacting a polyphenylene ether $f_1$) with a modifier which contains at least one of the abovementioned groups, in solution (WO-A 86/2086), in aqueous dispersion, in a gas phase process (EP-A-25 200) or in the melt in the presence or absence of suitable vinylaromatic polymers or impact modifiers, it being possible for free radical initiators to be present.

A preferably used component f) in the novel molding materials is a modified polyphenylene ether which is obtainable by reacting $f_1$) 70–99.95, preferably 75–95, % by weight of an unmodified polyphenylene ether, $f_2$) 0–29.95, preferably 4.89–20, % by weight of a vinylaromatic polymer, $f_3$) 0.05–30, preferably 0.1–5, % by weight of at least one compound selected from the group consisting of $f_{31}$) α,β-unsaturated dicarbonyl compounds, $f_{32}$) amido-containing monomers having a polymerizable double bond and $f_{33}$) monomers containing lactam groups and having a polymerizable double bond, and $f_4$) 0–5, preferably 0.01–0.09, % by weight of a free radical initiator, the percentage by weight being based on the sum of $f_1$) to $f_4$), and suitable mixing or kneading units, such as twin-screw extruders. The residence time is preferably from 0.5 to 15 minutes at from 240° to 375° C.

The vinylaromatic polymer $f_2$) is preferably compatible with the polyphenylene ether used.

The molecular weight of these conventional and commercially available polymers is in general from 1,500 to 2,000,000, preferably from 70,000 to 1,000,000.

Examples of preferred vinylaromatic polymers $f_2$) compatible with polyphenylene ethers are described in the abovementioned monograph by Olabisi, pages 224 to 230 and 245. Vinylaromatic polymers of styrene, chlorostyrene, α-methylstyrene and p-methylstyrene may be mentioned here merely as typical examples; furthermore, comonomers, such as (meth)acrylonitrile or (meth)acrylates, may be present in the structure in minor amounts (preferably not more than 20, in particular not more than 8, % by weight). Particularly preferred vinylaromatic polymers are polystyrene and toughened polystyrene. Mixtures of these polymers may of course also be used. The preparation is preferably carried out by the process described in EP-A-302 485.

Suitable modifiers f3) are, for example, maleic acid, methylmaleic acid, itaconic acid, tetrahydrophthalic acid, their anhydrides and imides, fumaric acid, the mono- and diesters of these acids, for example with $C_1$- and $C_2$-$C_8$-alkanols (monomers f31), the mono- or diamides of these acids, such as N-phenylmaleimide (monomers f32), and maleic hydrazide. Other suitable modifiers are the acyl chloride of trimellitic anhydride, benzene-1,2-dicarboxylic anhydride 4-carboxylic-acetic anhydride, chloroethanoylsuccinaldehyde, chloroformylsuccinaldehyde, citric acid and hydroxysuccinic acid. Examples of monomers f33) are N-vinylpyrrolidone and (meth)acryloylcaprolactam.

Examples of free radical initiators f4) are:

Di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butyl peroxy-3,3,5-trimethylcyclohexane, tert-butyl peroxyisopropylcarbonate, tert-butyl peroxy-3,3,5-trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butyl-peroxyisopropyl)benzene and di-tert-butyl peroxide. Other examples are organic hydroperoxides, such as diisopropylbenzene monohydroperoxide, cumene hydroperoxide, tert-butyl hydroperoxide, p-menthyl hydroperoxide and pinane hydroperoxide, as well as highly branched alkanes of the general structure

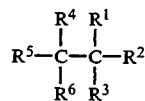

where $R^1$ to $R^6$ are each alkyl of 1 to 8 carbon atoms, alkoxy of 1 to 8 carbon atoms, aryl, such as phenyl or naphthyl, or 5-membered or 6-membered heterocyclic structures having a $\pi$-electron system and nitrogen, oxygen or sulfur as heteroatoms. The substituents $R^1$ to $R^6$ may in turn contain functional groups as substituents, such as carboxyl, carboxyl deriative, hydroxyl, amino, thiol or epoxy groups. Examples are 2,3-dimethyl-2,3-diphenylbutane, 3,4-dimethyl-3,4-diphenylhexane and 2,2,3,3-tetraphenylbutane.

In addition to these essential components A) to C) and, if required, components D) to F), the novel molding materials may contain conventional additives and processing assistants G). The amount thereof is in general up to 30, preferably up to 15, % by weight, based on the total weight of the components (A) to (G).

Examples of conventional additives are stabilizers and antioxidants, heat stabilizers and ultraviolet stabilizers, lubricants and mold release agents, dyes and pigments and plasticizers.

Additional pigments and dyes are generally present in amounts of up to 1 preferably up to 0 6, in particular up to 0.4, % by weight. Such pigments lead to a deepening of the color or to different dull gradations of the black color and are generally known (cf. for example R. Gächter and H. Müller, Taschenbuch der Kunststoffadditive, Carl Hanser Verlag, 1983, pages 494 to 510). A first preferred group of pigments comprises white pigments, such as zinc oxide, zinc sulfide, white lead ($2PbCO_3.Pb(OH)_2$), lithopone, antimony white and titanium dioxide. Among the two most commonly used crystal modifications (rutile and anatase types) of titanium dioxide, the rutile form is particularly used for obtaining various shades in the novel molding materials.

Black pigments which can be used according to the invention are iron oxide black ($Fe_3O_4$), spinel black (Cu, (Cr, Fe)$_2$O$_4$), manganese black (mixture of manganese dioxide, silica and iron oxide), cobalt black and antimony black and particularly preferably carbon black, which is generally used in the form of furnace black or gas black. (cf. in this context G. Benzing, Pigmente für Anstrichmittel, Expert-Verlag (1988), page 78 et seq.).

Antioxidants and heat stabilizers which may be added to the thermoplastic materials according to the invention are, for example halides of metals of group I of the Periodic Table of Elements, for example sodium halides, potassium halides or lithium halides, if necessary in combination with copper(I) halides, for example chlorides, bromides or iodides. Zinc fluoride and zinc chloride may also be used. Sterically hindered phenols, hydroquinones, substituted members of this group, secondary aromatic amines, if necessary in combination with phosphorus-containing acids or salts thereof, and mixtures of these compounds may also be employed, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Lubricants and mold release agents, which are added to the thermoplastic material as a rule in amounts of up to 1% by weight, are stearic acid, stearyl alcohol, alkyl stearates and stearamides, as well as esters of pentaerythritol with long-chain fatty acids. Salts of calcium, of zinc, or of aluminum with stearic acid and dialkyl ketones, e.g. distearyl ketone, may also be used.

The additives also include stabilizers which prevent the decomposition of the red phosphorus in the presence of moisture and atmospheric oxygen. Examples are compounds of cadmium, of zinc, of aluminum, of tin, of magnesium, of manganese and of titanium. Examples of particularly suitable compounds are oxides of the stated metals, as well as carbonates or basic carbonates, hydroxides and salts of organic or inorganic acids, such as acetates or phosphates or hydrogen phosphates.

The novel thermoplastic molding materials can be prepared by conventional methods, by mixing the starting components in conventional mixing apparatuses, such as screw extruders, Brabender mills or Banbury mills, and then extruding the mixture. After extrusion, the extrudate is cooled and comminuted.

The novel molding materials have good lightfastness and good flameproof properties, in particular phosphorus stability, and electrical properties, in particular creep resistance.

They are therefore suitable for the production of fibers, films and moldings which are used in particular in the electrical industry as, for example, switch parts, coil formers, contactors, etc.

EXAMPLES

The following components were used:

Component A

Polyamide 6.6 (polyhexamethyleneadipamide) having a viscosity number of 151 ml/g, corresponding to a relative viscosity $\eta_{rel}$ of 2.7 (measured as a 0.5% strength by weight solution in 96% strength by weight H$_2$SO$_4$ at 25° C. according to ISO 307).

Component B

Red phosphorus having a median particle size (d$_{50}$) of 45 μm.

Component C/1

Cu phthalocyanine pigment, Pigment Blue 15:3 or C.I. 74160 (Part 2) (Heliogen® Blue K 7090 from BASF AG).

Component C/2

Cu phthalocyanine pigment, Pigment Green 7 or C.I. 74260 (Part 2) (Heliogen® Green K 8730 from BASF AG).

Component C/1V

Nigrosine base SAPL from Orient Chem. Limited, Japan Nigrosine ≙ condensate of nitrobenzene and aniline with FeCl$_3$ as catalyst)

Component D

An olefin polymer of
60% by weight of ethylene
35% by weight of n-butyl acrylate
4.3% by weight of acrylic acid and
0.7% by weight of maleic anhydride,
having an MFI of 10 g/10 min at 190° C. and at a load of 1.16 kg.

Component E

Glass fibers having a mean diameter of 10 μm.

Component F/1

Zinc oxide.

Component F/2

Furnace black having a dibutyl phthalate adsorption (DBP adsorption) according to DIN 53 601 of 105 cm$^3$/100 g and a primary particle size of 16 nm (Black Pearls® 880 from Cabot Corp.)

Preparation of the molding materials

The components A) to F) were compounded in a twin-screw extruder (120 rpm, 30 kg/h) at 280° C. and extruded, and the extrudates were cooled in a water bath and granulated. The granules were dried at 80° C. under reduced pressure and processed on an injection molding machine at 280° C. to give standard test specimens.

To measure the phosphorus stabilities, test specimens (6×4.5×0.2 cm), each of which was divided into 5 equal strips, were left at 100% relative humidity at 70° C., and a sample was taken after 14 days to determine the water-soluble phosphorus compounds by AAS.

The determination of the creep resistance (CTI) was carried out according to DIN 112, ASTM-D 3638.

Color measurements according to DIN 5033:
ΔE=total color distance according to DIN 6174
ΔL=difference in light-dark direction
Δa=red-green difference
Δb=blue-yellow difference The sign +/− defines the difference relative to the standard or reference point; in this case, the reference point used was Comparative Example 6 with nigrosine as the black pigment.

ΔL + lighter
− darker

Δa + redder
− greener

Δb + yellower
− bluer

The total color difference ΔE is calculated as follows:

$$\Delta E = \sqrt{\Delta L^2 + \Delta a^2 + \Delta b^2}$$

Measuring instrument: Datacolor DC 3890
Measurement geometry: d/8° (diffuse)
Measurement conditions: including gloss
Light type: D 65 (daylight)

The composition of the molding materials and the results of the measurements are shown in the table.

TABLE 1

| Example | Composition [% by weight] | | | | | | | |
|---|---|---|---|---|---|---|---|---|
| 1 | 61.8 A | 6 B | 0.5 C/1 | 6 D | 25 E | 0.7 F/1 | |
| 2 | 61.3 A | 6 B | 1.0 C/1 | 6 D | 25 E | 0.7 F/1 | |
| 3 | 61.1 A | 6 B | 1.0 C/1 | 6 D | 25 E | 0.7 F/1 | 0.2 F/2 |
| 4 | 59.9 A | 6 B | 1.0 C/1 | 6 D | 25 E | 0.7 F/1 | 0.4 F/2 |
| 5 | 61.3 A | 6 B | 1.0 C/2 | 6 D | 25 E | 0.7 F/1 | |
| 6 | 60.3 A | 6 B | 2.0 C/1V | 6 D | 25 E | 0.7 F/1 | |
| 7*) | 62.3 A | 6 B | — | 6 D | 25 E | 0.7 F/1 | |
| 8*) | 60.3 A | 6 B | — | 6 D | 25 E | 0.7 F/1 | 2 F/2 |

*) for comparison

TABLE 2

| Example | P damage rate [ppm] after 14 days | CTI [Volt] | Color measurements | | | |
|---|---|---|---|---|---|---|
| | | | ΔE | ΔL | Δa | Δb |
| 1 | 3 | 600 | 3.1 | 3,0 | 0.6 | 0.3 |
| 2 | 6 | 600 | 2.3 | 2,3 | −0.4 | 0.2 |
| 3 | 4 | 550 | 1.5 | 1,4 | 0.2 | 0.6 |
| 4 | 3 | 500 | 1.1 | 0,9 | 0.3 | 0.6 |
| 5 | 3 | 600 | 2.3 | 2.2 | −0.5 | 0.3 |
| 6*) | 70 | 600 | Reference point | | | |
| 7*) | 2 | 600 | — | — | — | — |
| 8*) | 4 | 300 | 0.4 | 0.3 | 0.2 | 0.2 |

*) for comparison

We claim:

1. A flameproofed black thermoplastic molding material containing
   A) from 5 to 98.9% by weight of a thermoplastic polyamide,
   B) from 1 to 20% by weight of red phosphorus,
   C) from 0.1 to 5% by weight of a colorant having a color which is complementary to the color of red phosphorus in order to render the compositions black in color with the proviso that the pigment can not be copper (II) oxide,
   D) from 0 to 30% by weight of an elastomeric polymer,
   E) from 0 to 50% by weight of a fibrous or particulate filler or of a mixture thereof,
   F) from 0 to 70% by weight of a polyphenylene ether and
   G) from 0 to 30% by weight of conventional additives and processing assistants,
the percentages by weight of components A to G being 100% in each case.

2. A flameproofed black thermoplastic molding material as claimed in claim 1, wherein the colorant C) is a green, blue or violet pigment or a mixture thereof.

3. A flameproofed black thermoplastic molding material as claimed in claim 1, wherein the component C) is a copper phthalocyanine pigment.

4. A flameproofed black thermoplastic molding material as claimed in claim 1, wherein the component C) consists of a manganese violet or ultramarine pigment or of a mixture thereof.

5. A flameproofed black thermoplastic molding material as claimed in claim 1, wherein the component C) is composed of pigments based on chromium oxides or cobalt oxides.

6. A molding obtainable from a flameproofed, black thermoplastic molding material as claimed in claim 1.

7. A method for producing a flameproofed black thermoplastic molding material containing
   A) from 5 to 98.9% by weight of a thermoplastic polyamide,
   B) from 1 to 20% by weight of red phosphorus,
   C) from 0.1 to 5% by weight of a colorant,
   D) from 0 to 30% by weight of an elastomeric polymer,
   E) from 0 to 50% by weight of a fibrous or particulate filler or of a mixture thereof,
   F) from 0 to 70% by weight of a polyphenylene ether and
   G) from 0 to 30% by weight of conventional additives and processing assistants,
the percentages by weight of components A to G being 100% in each case which comprises adding as component C) from 0.1 to 5% by weight of a colorant which has a color which is complementary to the color of red phosphorus in order to render the composition black in color.

8. A method for producing flameproofed black thermoplastic molding material produced as claimed in claim 7, wherein the colorant C) is a green, blue or violet pigment or a mixture thereof.

9. A method for producing flameproofed black thermoplastic molding material produced as claimed in claim 7, wherein the component C) is a copper phthalocyanine pigment.

10. A method for producing flameproofed black thermoplastic molding material produced as claimed in claim 7, wherein the component C) consists of a manganese violet or ultramarine pigment or of a mixture thereof.

11. A method for producing flameproofed black thermoplastic molding material produced as claimed in claim 7, wherein the component C) is composed of pigments based on chromium oxides or cobalt oxides.

12. A molding obtainable from a flameproofed, black thermoplastic molding material produced as claimed in claim 7.

* * * * *